US010282889B2

(12) United States Patent
Tannenbaum et al.

(10) Patent No.: US 10,282,889 B2
(45) Date of Patent: May 7, 2019

(54) VERTEX ATTRIBUTE COMPRESSION AND DECOMPRESSION IN HARDWARE

(71) Applicant: Samsung Electronics Co., Ltd, Suwon-si (KR)

(72) Inventors: David C. Tannenbaum, Austin, TX (US); Manshila Adlakha, Dehradun (IN); Vikash Kumar, Argora (IN); Abhinav Golas, Mountain View, CA (US)

(73) Assignee: Samsung Electronics Co., Ltd. (KR)

( * ) Notice: Subject to any disclaimer, the term of this patent is extended or adjusted under 35 U.S.C. 154(b) by 38 days.

(21) Appl. No.: 15/432,782

(22) Filed: Feb. 14, 2017

(65) Prior Publication Data

US 2018/0150991 A1 May 31, 2018

Related U.S. Application Data

(60) Provisional application No. 62/427,587, filed on Nov. 29, 2016.

(51) Int. Cl.
*G06T 15/00* (2011.01)

(52) U.S. Cl.
CPC ........ *G06T 15/005* (2013.01); *G06T 2210/08* (2013.01)

(58) Field of Classification Search
None
See application file for complete search history.

(56) References Cited

U.S. PATENT DOCUMENTS

| 5,668,547 | A | * | 9/1997 | Lee | ............... | H03M 7/46 |
| | | | | | | 341/63 |
| 8,411,975 | B2 | | 4/2013 | Lee et al. | | |
| 8,564,604 | B2 | | 10/2013 | Jiao | | |
| 8,797,325 | B2 | | 8/2014 | Keall et al. | | |
| 9,058,685 | B2 | | 6/2015 | Keall et al. | | |
| 9,111,392 | B2 | | 8/2015 | Andersson et al. | | |
| 9,269,179 | B2 | | 2/2016 | Hakura et al. | | |
| 9,299,123 | B2 | * | 3/2016 | Goel | ............... | G06T 1/20 |
| 9,390,464 | B2 | | 7/2016 | Amsinck et al. | | |
| 2008/0043031 | A1 | * | 2/2008 | Jagmag | ............... | G06F 3/04897 |
| | | | | | | 345/581 |
| 2011/0221743 | A1 | | 9/2011 | Keall et al. | | |
| 2011/0261059 | A1 | | 10/2011 | Keall et al. | | |
| 2013/0275874 | A1 | | 10/2013 | Cerny et al. | | |
| 2014/0085314 | A1 | | 3/2014 | Steinke | | |
| 2014/0172810 | A1 | | 6/2014 | Paradies et al. | | |

(Continued)

*Primary Examiner* — Said Broome

(74) *Attorney, Agent, or Firm* — Innovation Counsel LLP

(57) ABSTRACT

One or more embodiments of the present disclosure provide an apparatus used in source data compression, comprising a memory and a at least one processor. The memory is configured to store vertex attribute data and a set of instructions. The processor is coupled to the memory. The processor is configured to receive a source data stream that includes one or more values corresponding to the vertex attribute data. The processor is also configured to provide a dictionary for the one or more values in the source data stream, wherein the dictionary includes a plurality of index values corresponding to the one or more values in the source data stream. The processor is also configured to lace at least some of the one or more values in the source data stream with corresponding index values of the plurality of index values.

16 Claims, 9 Drawing Sheets

(56) References Cited

U.S. PATENT DOCUMENTS

| | | |
|---|---|---|
| 2014/0267366 A1 | 9/2014 | Bolz et al. |
| 2014/0354666 A1 | 12/2014 | Yang |
| 2015/0379682 A1 | 12/2015 | Golas et al. |
| 2016/0035128 A1 | 2/2016 | Zhao et al. |
| 2016/0321834 A1* | 11/2016 | Sathe .................. G06T 1/60 |

* cited by examiner

VERTEX ATTRIBUTE COMPRESSION AND DECOMPRESSION IN HARDWARE

CROSS-REFERENCE TO RELATED APPLICATION AND CLAIM OF PRIORITY

This application claims priority under 35 U.S.C. § 119(e) to U.S. Provisional Patent Application No. 62/427,587 filed on Nov. 29, 2016. The above-identified provisional patent application is hereby incorporated by reference in its entirety.

TECHNICAL FIELD

This disclosure relates generally to data compression. More specifically, this disclosure relates to vertex attribute compression and decompression in hardware.

BACKGROUND

Polygons are used in computer graphics to compose objects. The polygons are generally defined by geometric data. The geometric data may include two different data sets. The first data set, which may be referred to as vertex attribute data, specifies vertices for the polygons. The vertex attribute data may also include additional data items for the polygons. The second data set may include connectivity information for the vertices. The connectivity information specifies which vertices form the different polygons for a given object. In illustration, an object such as a ball may be represented using a plurality of polygons referred to as a mesh. To create a visual effect such as motion, features such as shape, location, orientation, texture, color, brightness, etc. of the polygons forming the ball are modified over time.

In generating visual effects, geometric graphics data may be operated upon by a graphics processing unit (GPU) multiple times. Consider an example where an object such as a ball moves through space. The polygons forming the ball may be continually operated upon by the GPU to produce a motion effect for the ball. Among other operations, for example, the coordinates of the vertices of the polygons forming the ball may be continually modified to produce the motion effect. Accordingly, the geometric graphics data flows through the graphics pipeline of the GPU multiple times in order to support such processing. A graphics pipeline refers to the processing or sequence of steps performed by a GPU to render a two-dimensional raster representation of a three dimensional scene.

The GPU moves graphics data from memory and through the graphics pipeline. The geometric graphics data, including the vertex attribute data for the polygons, consumes a significant amount of the memory bandwidth. Given the demand for high quality graphics across various applications including games, the already high memory bandwidth requirements of graphics applications are likely to increase.

SUMMARY

This disclosure provides vertex attribute compression and decompression in hardware.

A first embodiment of the present disclosure provides an apparatus comprising a memory and at least one processor. The memory is configured to store a source data and a set of instructions. The at least one processor is coupled to the memory. The at least one processor is configured to execute the set of instructions to receive a source data stream that includes one or more values corresponding to the vertex attribute data. The at least one processor is also configured to execute the set of instructions to provide a dictionary for the one or more values in the source data stream, wherein the dictionary includes a plurality of index values corresponding to the one or more values in the source data stream. The at least one processor is also configured to execute the set of instructions to replace at least some of the one or more values in the source data stream with corresponding index values of the plurality of index values.

A second embodiment of the present disclosure provides a method for source data compression. The method includes receiving a source data stream that includes one or more values corresponding to vertex attribute data stored in memory. The method also includes providing a dictionary for the one or more values in the source data stream, wherein the dictionary includes a plurality of index values corresponding to the one or more values in the source data stream. The method also includes replacing at least some of the one or more values in the source data stream with corresponding index values of the plurality of index values.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged graphics system.

Figure 1:
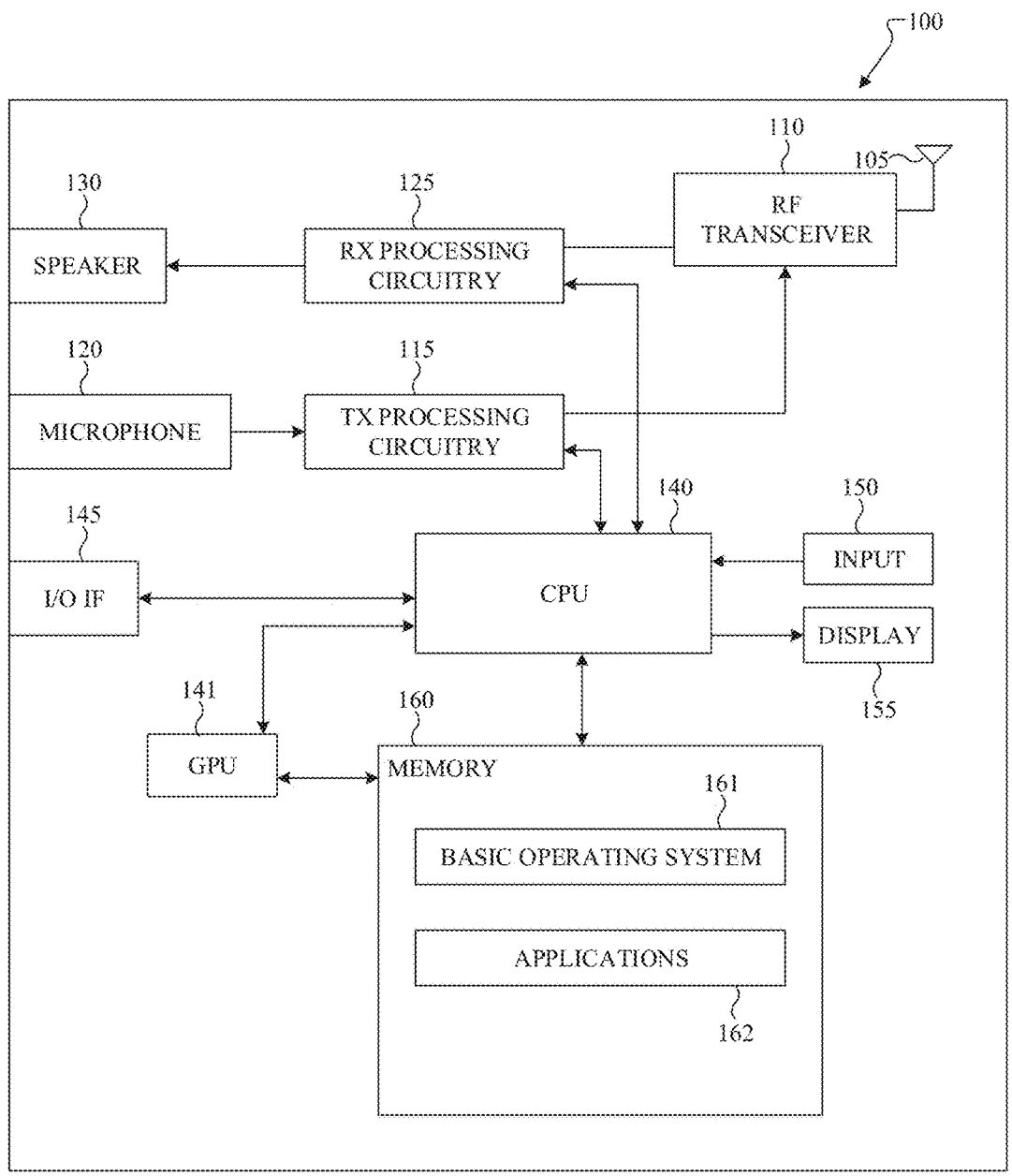
FIG. 1 illustrates an example user equipment (UE) according to this disclosure.

FIG. 1 illustrates an example UE 100 according to this disclosure. The embodiment of the UE 100 illustrated in FIG. 1 is for illustration only. However, UEs come in a wide variety of configurations, and FIG. 1 does not limit the scope of this disclosure to any particular implementation of a UE.

As shown in FIG. 1, the UE 100 includes an antenna 105, a radio frequency (RF) transceiver 110, transmit (TX) processing circuitry 115, a microphone 120, and receive (RX) processing circuitry 125. The UE 100 also includes a speaker 130, a central processing unit (CPU) 140, a graphics processing unit (GPU), an input/output (I/O) interface (IF) 145, a input 150, a display 155, and a memory 160. The memory 160 includes a basic operating system (OS) program 161 and one or more applications 162.

The RF transceiver 110 receives, from the antenna 105, an incoming RF signal transmitted by an eNB of a network. The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the CPU 140 for further processing (such as for web browsing data).

The TX processing circuitry 115 receives analog or digital voice data from the microphone 120 or other outgoing baseband data (such as web data, e-mail, or interactive video game data) from the CPU 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105.

The CPU 140 can include one or more processors or other processing devices and execute the basic OS program 161 stored in the memory 160 in order to control the overall operation of the UE 100. For example, the CPU 140 could control the reception of forward channel signals and the transmission of reverse channel signals by the RF transceiver 110, the RX processing circuitry 125, and the TX processing circuitry 115 in accordance with well-known principles. In some embodiments, the CPU 140 includes at least one microprocessor or microcontroller.

The CPU 140 is also capable of executing other processes and programs resident in the memory 160. The CPU 140 can move data into or out of the memory 160 as required by an executing process. In some embodiments, the CPU 140 is configured to execute the applications 162 based on the OS program 161 or in response to signals received from eNBs or an operator. The CPU 140 is also coupled to the I/O interface 145, which provides the UE 100 with the ability to connect to other devices such as laptop computers and handheld computers. The I/O interface 145 is the communication path between these accessories and the CPU 140.

The CPU 140 is also coupled to the input 150 and the display 155. The operator of the UE 100 can use the input 150 to enter data into the UE 100. The input can be a touch sensitive screen, keyboard, mouse, gamepad, joystick, biofeedback device, etc. The display 155 may be a liquid crystal display or other display capable of rendering text and/or at least limited graphics, such as from web sites.

The GPU can include one or more processors or other processing devices and is designed to rapidly manipulate and alter memory 160 to accelerate the creation of images in a frame buffer intended for output to a display. The GPU 141 may be responsible for data compression and/or decompression. The GPU 141 can be separate from the CPU 140, or in some embodiments, may be a part of CPU 140.

The memory 160 is coupled to the CPU 140 and GPU 141. Part of the memory 160 could include a random access memory (RAM), and another part of the memory 160 could include a Flash memory or other read-only memory (ROM).

As described in more detail below, geometry used in graphics applications running on GPUs is traditionally defined as meshes. These meshes consist of two data sets: vertices or points; and connectivity information defining polygons consisting of these vertices. This geometry data gets streamed one or more times through a GPU pipeline, and thus constitutes a significant portion of memory traffic.

With increasingly complex and open-world games becoming popular, geometry complexity is likely to become an increasingly larger share of memory traffic on GPUs.

Vertices are traditionally loaded onto the GPU using Vertex Buffers (VB), while connectivity information is defined in Index Buffers (IB). Vertex Buffers define properties of vertices—called attributes—using numbers with specific values at each vertex. These attributes typically include a position—commonly in 3D space—defined using single-precision floating-point numbers, amongst others. This vertex attribute data may be accessed in any arbitrary order by the GPU hardware, as dictated by the IB, and by how the GPU chooses to render objects.

The unifying characteristic of these attributes over multiple attributes is reuse as multiple vertices and attributes may reuse the same values. Complex meshes may be simplified by reducing the variation of attribute values and fidelity, again leading to reuse of attribute values. Another aspect of this data is that the reuse of attribute values may be within a small window of contiguous vertices, thus the search for redundant data can be done in a localized region.

Although FIG. 1 illustrates one example of UE 100, various changes may be made to FIG. 1. For example, various components in FIG. 1 could be combined, further subdivided, or omitted and additional components could be added according to particular needs. As a particular example, while FIG. 1 illustrates the UE 100 configured as a mobile telephone or smartphone, UEs could be configured to operate as other types of mobile or stationary devices.

Figure 2:
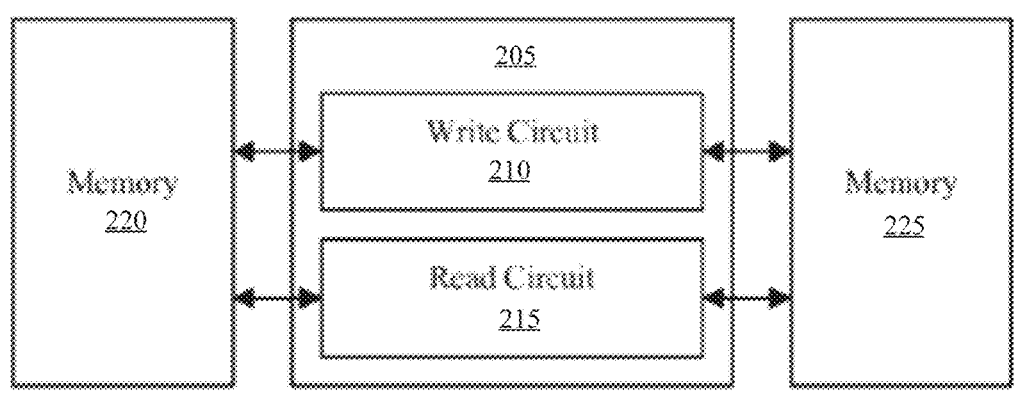
FIG. 2 illustrates a block diagram of exemplary graphics components according to embodiments of the present disclosure.

FIG. 2 illustrates a block diagram of exemplary graphics components 205 according to embodiments of the present disclosure. The embodiment of the graphics components 205 shown in FIG. 1 is for illustration only. Other embodiments could be used without departing from the scope of the present disclosure. The components 205 can be one example of at least part of a GPU 141 as shown in FIG. 1.

In FIG. 2, components 205 is coupled to a memory 220 and a memory 225. In the example of FIG. 2, system 205 includes a write circuit 210 and a read circuit 215. In this example, write circuit 210 and read circuit 215 are shown as separate units. In other example embodiments, circuits 210 and 215 may be a part of the same component.

Graphics components 205 may operate upon one or more polygons at a time. Components 205 are configured to perform operations involving geometric graphics data. In one particular example, components 205 are configured to perform operations upon vertex attribute data.

A vertex is defined as a basic unit of geometry and is intuitively a point in space. Combinations of vertices are used to create primitives. For example, one vertex creates a Point primitive, two vertices create a Line Segment, while three vertices create a Triangle. An attribute or vector attribute defines a property of a vertex. For example, the most common attribute is position, defining the location of a vertex in space. Other examples of attributes include color, texture coordinates, etc.

Vertex attribute data may include one or more vector attributes. Each vector attribute may include, or be formed of, a number of scalar components. In one example, the number of scalar components of a vector is limited to four, though the embodiments described within this disclosure are not limited by the number of scalar components included in a vector. For example, a vector may include greater or fewer than four scalar components.

Examples of vector attributes, may include or specify, position, color, texture, or the like. In the case of a position attribute, for example, the attribute may be formed of three scalar attributes. Vector attributes can be referred to herein as "attributes." The scalar attributes may be an x-coordinate, a y-coordinate, and a z-coordinate. A scalar attribute is a numerical value defining a whole or part of a vertex attribute.

In one or more embodiments of this disclosure vertex attribute data used in computer graphics applications is defined in terms of multiple vector attributes, each of which consists of one to four numbers of an underlying data type. This underlying data type may be a 32-bit single precision floating point (called float or fp32). Examples of common fp32 attributes are the 3-dimensional position of the vertex, as well as a 2-dimensional texture coordinate. Other datatypes, for example signed or unsigned integers, are also used in vertex attributes.

Each vector attribute consists of one, two, three, or four scalar attributes, each scalar attribute being a 1, 2, or 4 byte numerical value. For example, position in 3D space consists of 3 scalars: x, y, and z, each may be represented as an fp32 (or float datatype in C/C++) value. With color, for example, the scalar attributes may be a red value, a green value, and a blue value (RGB values).

A scalar is an amalgamation of one or more scalar attributes that fit within 32-bits. If the size of a scalar is narrower than 32 bits, a scalar is always the maximum number of scalar attributes from one vector attribute that can fit in one 32-bit value. For example, three scalar attributes of type fp32 constitute three scalars, while if the type were fp16, they may constitute two scalars, the first containing the first two scalar attributes (x, y), with the second containing the 16-bit "z".

Within this disclosure, the term "component" refers to an individual item of a vector of vertex attribute data. Each component can be a scalar attribute. Components may be specified using any of a variety of different data types. The term "data type" is a classification identifying one of various types of data. Exemplary data types of components may include, but are not limited to, floating point, fixed point, integer, Boolean, character strings, and/or the like. Further examples may include one or more or other data types of particular bit widths or precisions. In one or more embodiments, components of a same component type are specified using a same data type. Thus, x-coordinates are specified using a same data type. Y-coordinates are specified using a same data type, etc.

In general, write circuit 210 may receive vertex attribute data. The vertex attribute data may be received as a source data stream (e.g., from memory 220 or another source. As part of writing, write circuit 210 may process vertex attribute data as a block of k vertices, where k is two or more. For example, k may be set equal to 2, 4, 8, 16, 32, or the like. Write circuit 210 may select a plurality of vertices, e.g., k vertices, of vertex attribute data and form packets on a per group basis. A block is a collection of all input vector attributes for a set of vertices. The block can consist of a set of packets. A packet is a collection of scalars for a set of vertices constituting a block, where the scalar consists of specific scalar attributes from one vector attribute, wherein the same specific scalar attributes are taken from all vertices in the block. Write circuit 210 may compress the vertex attribute data and write the compressed vertex attribute data within memory 225. The write circuit 210 may also create a dictionary to compress the input source data.

Read circuit 215 may fetch compressed vertex attribute data from memory 225. Read circuit 215 may decompress vertex attribute data, e.g., a block and/or a portion thereof, fetched from memory 225. Read circuit 215 may store the resulting decompressed vertex attribute data, or a portion thereof, within memory 220. Read circuit 215 may store the resulting decompressed vertex attribute data within memory 220 for use or consumption by another system such as a graphics system.

In one example, memory 220 and memory 225 are implemented as a random access memory (RAM). In different example embodiments, memories 220 and 225 could also be implemented as a cache within the memory subsystem, as static RAM (SRAM), or dynamic RAM (DRAM). In one example embodiment, memory 225 and memory 220 may be a part of the same memory element, but simply different locations within that memory element. In another embodiment, memories 220 and 225 can be separate memory elements.

In another example embodiment, the write circuit 210 could read from memory, which may be DRAM, and write an output into memory that may be the same DRAM or a second memory location, such as an internal memory. The read circuit 215 may then read from that same DRAM or second memory location (wherever the output was written) and write an output into the same memory of which the data was read or a third memory location. One example provides for the read circuit 215 to directly deliver a decompressed output to a GPU fixed-function unit.

Components 205 may be implemented as various circuit components and/or ICs coupled to a printed circuit board or other electrical platform. For example, components 205 may be implemented within, or as part of, a graphics processing card or the like. Components 205 may be incorporated within a larger data processing system such as a computer, a gaming system, or the like. In another exemplary implementation, components 205 may be incorporated within a processor. For example, a GPU may include components 205 therein to facilitate more efficient processing of vertex attribute data.

Figure 3:
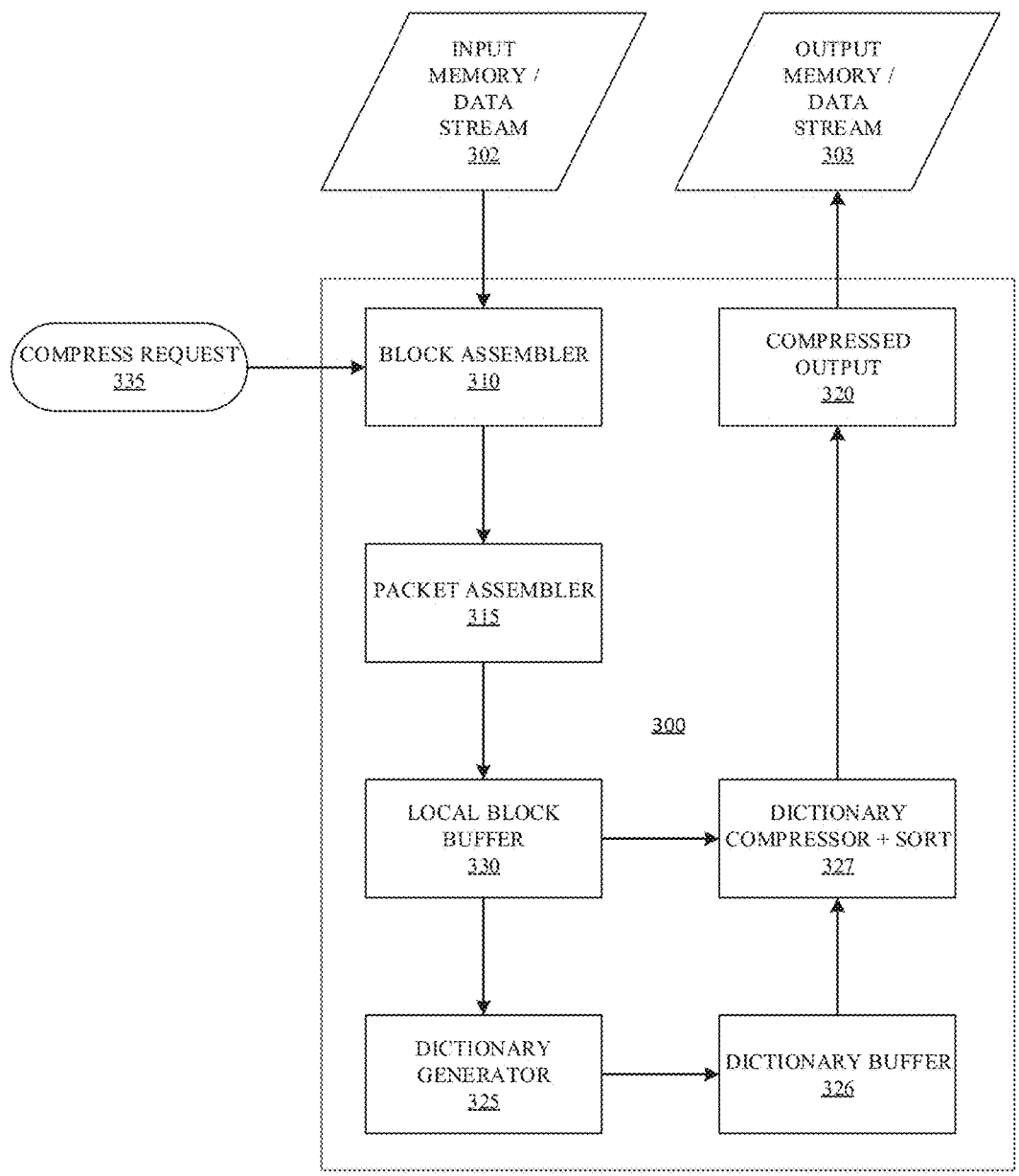
FIG. 3 illustrates a block diagram of an exemplary implementation of a write circuit illustrated in FIG. 2 according to embodiments of the present disclosure.

FIG. 3 illustrates a block diagram of an exemplary implementation of a compressor 300 according to embodiments of the present disclosure. The compressor 300 can be a set of instructions to be executed by a processing device, such as a CPU 140 or GPU 141. In other embodiments, one or more components of the compressor 300 can be implemented as part of components 205 as illustrated in FIG. 2. The embodiment of the compressor 300 shown in FIG. 3 is for illustration only. Any embodiments could be used without departing from the scope of the present disclosure through the use of hardware, software, or a combination thereof.

In FIG. 3, compressor 300 may be configured to receive a compress request via signal 335. The compressor request may specify vertex attribute data to be written to memory 303. Responsive to the compress request, block assembler 310 may create a block of vertices. For example, block assembler 310 can generate a block of k vertices, where each block can include at least two vertices. The value of k may also be specified as vertex i through vertex j of vertex attribute data stored in memory 302 in decompressed form. As such, the instruction to create a block indicates which vertices are to be included in the block to be created. Responsive to the block creation instruction, block assembler 310 may request the attribute layout for the vertex attribute data. More particularly, block assembler 310 may request the vertex attribute layout for the particular vertices to be included within the block. Block assembler 310 may receive the vertex attribute layout. The vertex attribute layout, for example, may specify the particular vector attributes, and the scalar attributes constituting these vector attributes, that must exist for each set of vertices to be included within the block.

Using the vertex attribute layout, block assembler 310 may determine the particular attributes that will be included in the vertex attribute data for each of vertices i through j. Block assembler 310 may determine the number of packets to be included in the block for vertices i through j. Block assembler 310 may instruct packet assembler 315 to create packets for vertices i through j.

Packet assembler 315 may request the vertex attribute data for vertices i through j. Packet assembler 315, responsive to receiving the vertex attribute data for vertices i through j, may generate one or more packets that are provided to local block buffer 330. In one or more embodiments, each packet includes one or more scalar attributes that may reside in a scalar. Packets may accumulate within local block buffer 330 until the block is complete. Packet assembler 315 may notify block assembler 310 that packet(s) of the block are ready within local block buffer 330 for compression.

Dictionary generator 325 may receive the block from local block buffer 330. Block assembler 310 may indicate to dictionary generator 325 to begin compression of the block. As such, packet assembler 315 may be configured to notify block assembler 310 that a packet is ready to be compressed. Block assembler 310, in response to the notification from packet assembler 315, may notify dictionary compressor 327 to begin compression. Packets may be compressed in sequence to maintain packet position within the resulting compressed data.

Dictionary compressor 327 may compress and sort the block (e.g., by performing one or more of the disclosed techniques for using a dictionary, implementing run-length coding, etc.) using the information from dictionary buffer 326 and local block buffer 330 with dictionary buffer 326. The dictionary compressor 327 can output the compressed data as compressed output 320.

Compressor 300 further may generate metadata that is provided to memory 303. Metadata can be auxiliary information that allows access into compressed data in a random or near-random order. Dictionary generator 325 further may provide a dictionary that is used for the compression of the block to memory 303 (as described in greater detail below with respect to FIG. 4). Responsive to the indication that compression is complete, compressor 300 may write the metadata and the dictionary to memory 303. In one aspect, compressed output 320 may write the metadata to a first region of memory 303 and the dictionary to a second and different region of memory 303.

In one aspect, the metadata may include an index array. The index array, for example, may map the block and packets therein to a memory location where the block is stored within memory 303. The index array may include an n bit descriptor denoting a multiple of a number of m bytes that are loaded to get the compressed block. The number of descriptors that can fit in a block of m bytes is $(8*m)/n$, where m is in bytes and n is in bits. For example, using a cache line size wherein m is 64 bytes and n is 4 bits, the size may be determined according to size=m*2 descriptors=64*2 descriptors.

Figure 4:
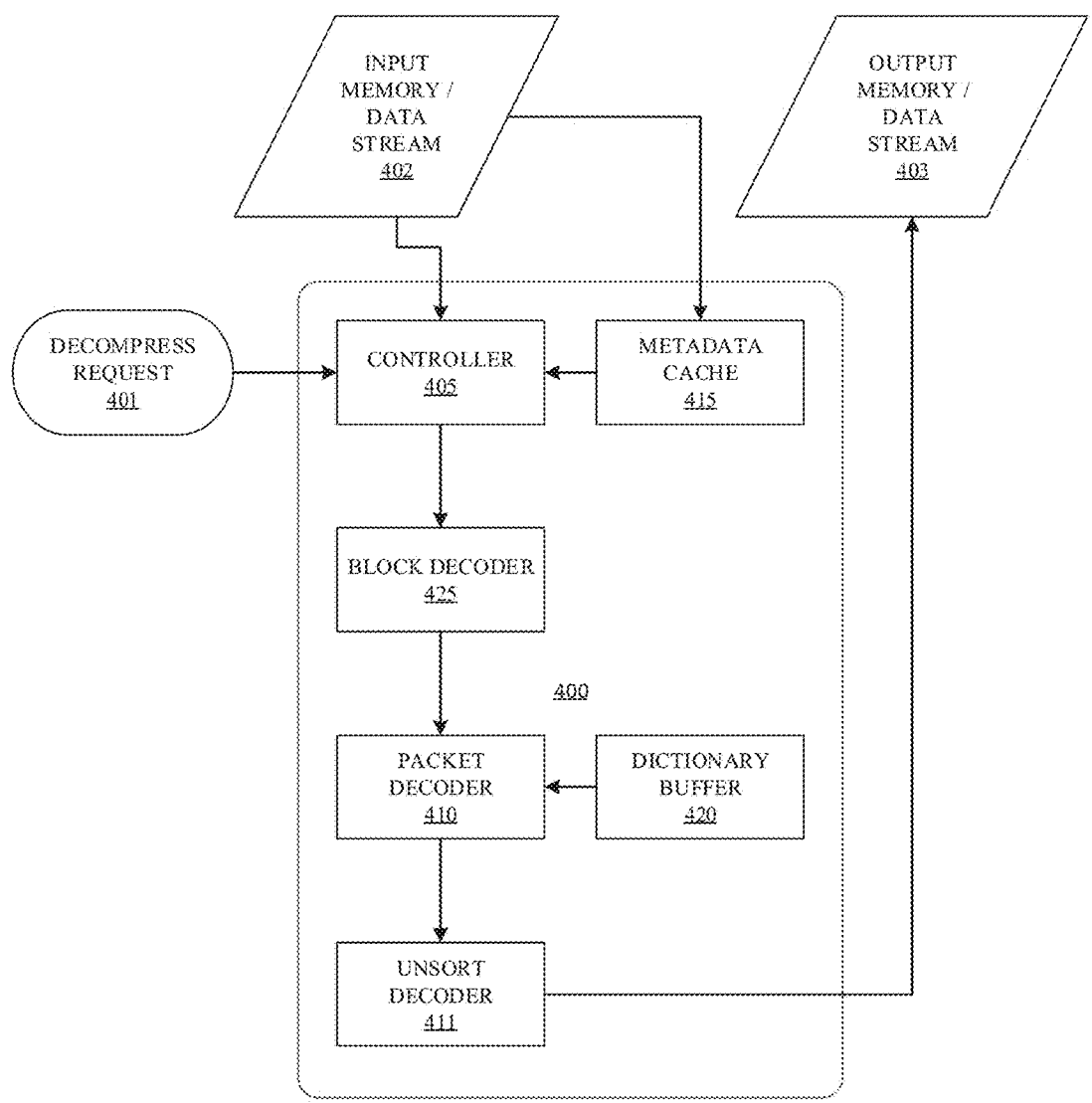
FIG. 4 illustrates a block diagram of an exemplary implementation of a read circuit illustrated in FIG. 2 according to embodiments of the present disclosure.

FIG. 4 illustrates a block diagram of an exemplary implementation of a decompressor 400 according to embodiments of the present disclosure. The embodiment of the decompressor 400 shown in FIG. 4 is for illustration only. Any embodiments could be used without departing from the scope of the present disclosure. In one example embodiment, the decompressor 400 can be read circuit 215 illustrated in FIG. 2

In the example of FIG. 4, decompressor 400 may be configured to receive a decompress request via signal 401. The decompressor 400 may be configured to receive, e.g., fetch, a dictionary from memory 402. The received dictionary is used to decompress compressed blocks fetched from memory 402. It should be appreciated that the dictionary need only be fetched per vertex buffer. For example, the dictionary may be loaded once and kept in dictionary buffer 420 for an extended period of time while one vertex buffer is being used.

Controller 405 may be configured to receive decompress requests. Responsive to a decompress request, controller 405 may be configured to query metadata cache 415 via signal 434 to determine whether metadata cache 415 includes the portion of metadata needed to translate an address, e.g., a first address, specified by the decompress request into a second address within memory 402 specifying compressed data.

In an embodiment, metadata may need to be fetched multiple times depending on the size of metadata cache 415. The addressing used within the metadata may be linear. The size of an entry, for example, may be constant and may include a base address and a size of blocks specified as a number of cache lines. In another aspect, the base address may be known a priori, in which case the metadata may only specify size. In one example, each compressed block, for example, may begin at an address determined as (known base address)+(block ID*size of the uncompressed block). The address of the metadata for a block may be specified as a metadata base address plus the product of the block ID and the size of a metadata row. Metadata cache 415 knows whether the requested address exists therein, i.e., is stored locally within metadata cache 415, or not. If so, metadata cache 415 provides the metadata for the requested address to controller 405. If not, metadata cache 415 may send a metadata request to memory 402.

In response to the metadata request, metadata cache 415 may receive a metadata response. Metadata cache 415 may provide the received metadata, e.g., the index array, to controller 405. Using the received metadata, controller 405 may translate the first address specified in the received decompress request to a second address where the compressed block is stored in memory 402. Controller 405 may be configured to send a decompress request to memory 402. The decompress request from controller 405 to memory 402 may specify the second address indicating a particular compressed block to be fetched.

The metadata may include one line of data per compressed block. Referring to FIG. 3, for example, each block may be stored by compressor 300 in a memory region having a size that is a multiple of the cache line size of m referring to the example above. Data may be fetched from memory 402, e.g., a RAM, as one or more cache lines. The number of cache lines that a block may require for storage in the worst case is the uncompressed size of the block. The number of cache lines may be expressed using descriptor bits. In general, the size of a compressed block may be expressed using the descriptor bits, which are added to the metadata.

For example, if the request is received for vertex i, attribute j, a metadata lookup may be performed. The block ID needed may be expressed as floor(i/<#vertices per block>). The resultant value is the largest integral value less than or equal to the vertex i divided by the number of vertices in the block. The block ID may serve as the row to be accessed in the index array of the metadata. From the index array, the base address in memory 402 from which to read the requested compressed block may be determined. Using the descriptor bits, the number of cache lines to request may be determined. Block decoder 425 may decompress the compressed block using the dictionary provided from dictionary buffer 420. Block decoder 425 may output decompressed packets to packet decoder 410.

Dictionary buffer 420 may provide the dictionary to packet decoder 410. As noted, packet decoder 410 may receive the block requested from block decoder 425. Packet decoder 410 may receive metadata. In one aspect, packet decoder 410 may determine whether packets require decoding and the particular decoding to be performed, if at all, from the received metadata. The metadata may be used by packet decoder 410 to decode packets, if needed, of the received block. Packet decoder 410 may selectively decode packet(s) of the block using the metadata and output the decompressed vertex attribute data to unsort decoder 411, which may unsort the data and then provide the decompressed data to memory 403.

As noted, for example, packet decoder 410 may determine, from the metadata, whether a packet is uncompressed or compressed. Further, in another aspect, packet decoder 410 may determine, from the metadata, a particular output format in which the vertex attribute data should be written.

In still another aspect, packet decoder 410 may provide an offset of the desired data. Using the offset, the requesting system may index into the uncompressed block to locate the data that was initially requested.

As will be described in more detail below, embodiments of this disclosure capture reuse across a vertex buffer (VB) by creating a finite-size dictionary of the most commonly used values. Then in the data stream, occurrences of these values are replaced by a dictionary index.

One example embodiment provides encoding continuous occurrences of a value using run-length encoding (RLE). For example, if the value 1.35 occurs 4 times, then instead of keeping 4 copies of the value, it is replaced by the tuple (4, 1.35) noting that there are four contiguous occurrences of the value.

This example embodiment can also provide partitioning VB data into blocks of vertices, where each block then contains all relevant attributes of those vertices. Each such chunk is further subdivided into packets, where each packet contains one or more scalar attribute components of a vector attribute for all vertices in the block.

The embodiments of this disclosure can sort data within each packet in an arbitrary order to allow for longer runs of references of data. In different embodiments, sorting can be performed within each packet in a particular or specific order.

The system can replace any value in the data stream which exists within a pre-computed dictionary with a binary dictionary index, thus for an N-entry dictionary, the value can be replaced by a ceil(log 2(N)) bit index, where the ceil(x) function returns the next integer greater than or equal to x. In different examples, the number of bits for the value can be, but not limited to 8, 16, 24, 32, 64, etc. The system described herein can use a dictionary on a source data stream. A dictionary in this disclosure may be used with a single VB or shared across VBs.

The compressed data stream from the system may not have variable-length encoded components; the bit-width of all portions is known apriori or can be determined from previous portions of the data stream before the relevant portion is read. The compressed data stream consists purely of fixed-width binary numbers, albeit of different widths. This can simplify decoder hardware in situations where multiple decompressed values are required per cycle (i.e., a decode throughput of k values per cycle, k>1), versus a variable-length bit-encoding scheme.

Figure 5:
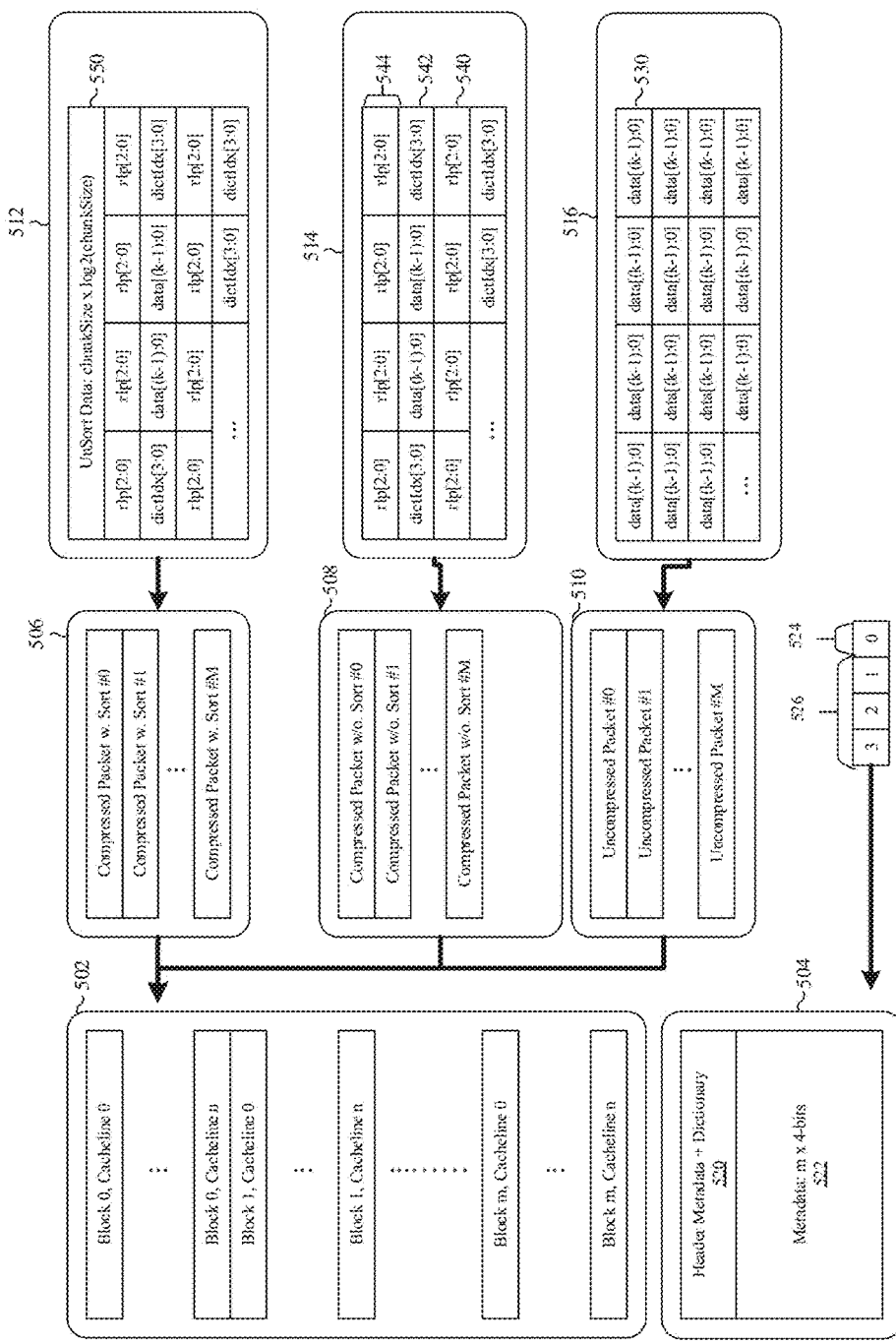
FIG. 5 illustrates a block diagram of an exemplary layout of a compressed vertex buffer according to embodiments of the present disclosure.

FIG. 5 illustrates a block diagram of an exemplary layout of a compressed vertex buffer 500 according to embodiments of the present disclosure. The embodiment of the vector buffer 500 shown in FIG. 5 is for illustration only. Other embodiments could be used without departing from the scope of the present disclosure.

In the example of FIG. 5, vector buffer 500 includes compressed vector data 502 and metadata 504. The compressed vector data 502 can be comprised of blocks 506-510, with each block including a number of packets 512-516.

FIG. 5 consists of two pieces of information—data 502 and metadata 504. As the name indicates, data 502 is the actual compressed vector attributes, while metadata 504 is auxiliary information that allows access into compressed data in random order.

Compressed vector data 502 is organized in a hierarchical manner, with blocks 506-510 being the coarsest level—the entity that is compressed and decompressed together—and packets 512-516 underneath it. Given a set of attributes defined for every vertex, a block contains all of the attributes for a continuous range of vertices, where the size of the range may be set as desired, but may be restricted to a few values—powers of two such as 4, 8, 16 or 32 for example—and is referred to as the chunk size (or chunkSize). Thus block "i" contains attribute data for vertices (echunkSize) through ((i+1)*chunkSize) (not inclusive.)

Each block contains a set of packets, with each packet containing data for one scalar (not scalar attribute.) A packet begins as an array of scalars, where the array length is chunkSize. The compressor may convert each packet into one of 3 types: Uncompressed where the packet 516 remains an unmodified array of scalars of length chunkSize; Compressed without Sort where the packet 514 is compressed using a combination of RLE and a dictionary of frequently used scalar values; Compressed with Sort where packet 512 is first sorted, after which RLE and dictionary methods are applied For simplicity, any block may only contain packets of a single type. Otherwise, the type for each packet must also be encoded into the block at the beginning. The following description refers to this simplified embodiment, however various embodiments can be expanded to include variations in packet types within a block.

An embodiment of this disclosure can use RLE for compression, as illustrated in packets 512 and 514, where continuous occurrences of a value in a stream can be replaced with a pair—(number of occurrences, value)—with this pair encoded efficiently for greater savings. In general, most naturally occurring data is biased towards short run-lengths, with longer run-lengths being uncommon.

In an embodiment, RLE is designed to choose a balance of frequency of occurrence with compression. For example, run-lengths of 2 may be very common, but they will also result in a compression ratio of <2X owing to the additional run-length that must be stored with the data. Alternatively, a longer run-length of 8 or 16 may be rarer, but also provides a significantly higher compression ratio. The embodiments of this disclosure use RLE within packets 512-516 to track continuous reuse of values within it, as the probability of continuous reuse is the highest within a packet.

In one embodiment, dictionary methods, as illustrated in packets 512 and 514, rely on creating a histogram of the input data—that is, a table noting the number of times each unique value occurs in the input. The histogram is then sorted in descending order of the frequency, after which the top n values are used as the dictionary, for a certain fixed n. In another example embodiment, the dictionary may be created after run-length encoding the input date (with or without sorting) such as to maximize compression in the output data stream.

These values can be represented in the data stream as the index into the dictionary (also called palette in texture nomenclature) along with additional metadata pointing to the usage of the dictionary itself—since the dictionary does not contain all values, some indication must be added to the compressed data stream noting whether the next value read is a dictionary index or plain data.

Compression obtained by dictionary methods is valuable as long as the index into the dictionary can be expressed using many fewer bits than the data itself. These indices may be represented as fixed-width binary values, or varying-length codes. For simplicity of hardware, the embodiments of this disclosure rely purely on fixed-width binary indices, though alternate embodiments may use variable-width indices.

Sorting, as illustrated in packet 512, in any order—ascending, descending, or similar—ensures that copies of the same unique value begin to occur in the same contiguous neighborhood in the output stream. This ensures that run-lengths are maximized, thereby increasing compression.

When using sorting, to recreate the original input stream, the original order of data may also be encoded in the stream (called unsorting information/metadata in this disclosure.)

FIG. 5 also shows an example of metadata 504 including a header 520 and data 522. The data 522 may be organized in 4-bits: 1-bit sortEn 524, which indicates where the block is located and 3-bit nCachelines 526, which indicates the number of cachelines to be fetched. This embodiment includes an implicit assumption that only eight cachelines are fetched, the metadata 504 can be generalized to ceil(log 2(k)) bits where the maximum size of a block is k cachelines—the overall metadata entry will then be (1+ceil(log 2(k)) bits.

One such metadata entry exists for each block. This organization is designed to interact with the memory subsystem, which commonly operate efficiently at the granularity of a cacheline, i.e., an aligned chunk of data—32 or 64 bytes—which can be fetched and modified in one operation in the memory subsystem. This metadata design is optimized to minimize its size, and thus metadata overhead—thus in this embodiment this consumes 0.5 byte for 512 bytes of data, an overhead of <0.01%.

In this embodiment, blocks 506-510 are stored at the beginning of their intuitive storage range, i.e., for block i the base address is i*sizeofBlockInCacheLines. This allows fetch computations to be simplified. An alternate embodiment can provide blocks packed together. In such an alternate embodiment, a metadata entry may contain a base address and the number of cachelines to fetch.

The dictionary for a vector buffer 500 is packed in the header 520 at the beginning of metadata. Since the number of entries in the dictionary is fixed apriori, the number of bytes to fetch for the dictionary is essentially a product of the number of entries and the size of entry, where the size of each entry is expected to be 32-bits, owing to fp32 data being of that size, though other sizes are possible and may be used. The dictionary is organized as a simple array, where the value is accessed as dict[index] in C programming notation.

In addition to the dictionary, certain header 520 metadata is also needed to assist the decoder which is also stored with the dictionary. The header 520 can include a size of each scalar in bytes—this helps define the amount of uncompressed data each packet produces, and can also include a size of an uncompressed vertex, or the sum of the previous field for all enabled scalars.

The first field of the metadata 504 allows the decoder to detect it has reached the end of a particular packet. The number of scalars active in a vector buffer 500 is information that is passed to the decoder traditionally as state, or otherwise may also be packed into the metadata 504. The size of an uncompressed vertex also directly translates into the size of an uncompressed block (by multiplying by chunkSize). This size is required to detect if the block is uncompressed—if the number of cachelines to be fetched for a block is the same as the number of cachelines that would be occupied by an uncompressed block, then the block must be kept uncompressed, as there is little benefit to be gained in terms of energy or performance in compressing it.

As described, three types of packets exist within vector attribute compression, Uncompressed, Compressed without Sort, and Compressed with Sort. Uncompressed packet 516 can include arrays of scalars 530. One example of a field representation may be data[chunkSize][k:0], where the function includes an array of data, where each entry is (k+1) bits wide. Compressed packets 514, which does not use sorting, includes sets of RLE prefix information 540, followed by data or dictionary indices 542. To reduce hardware complexity in fetching data from cachelines, all prefixes 540 are clustered into sets to make their sizes multiples of a minimum size-4-bits in this case. If the number of prefixes 540 is not a multiple of this set size, then the number is rounded up to the next multiple. Decoder hardware is expected to detect when chunkSize values have been read, and stop reading the stream at that point, as the number of data entries is not padded up.

A Run-Length Prefix (RLP) can include a dictEn[0:0] field as a dictionary enable bit. If the bit is 1, the data entry is a 4-bit dictionary index, else is a k bit data value. Where k, can be, but is not limited to, one of 8, 16, 24, 32, 64 bits, etc. One example field can be runLength[m:0] as an enumeration noting run-length. An example enumeration for when m==1 is 00→1, 01→2, 10→4, 11→chunkSize. In one example embodiment, for 2-bit RLPs, a set of four contiguous RLPs is referred to as an RLP set 544. For run lengths with different bit widths, a different number of RLPs per set can be used. For example, if runLength is a 4-bit number, an RLP set may be one RLP.

For each RLP 540 in an RLP set 544, the dictEn bit denotes whether the value is an index into the dictionary 542 dictIdx[(n-1):0] (for a dictionary that contains $2^n$ entries) or an uncompressed data value 530 data[(k-1):0] The number of RLP sets 544 is such that the sum of their run lengths adds up to a number greater than or equal to chunkSize. However, decoder hardware may only parse and interpret RLPs until the point that the sum of run lengths adds up exactly to chunkSize. Even if RLPs are padded up to multiples of four to create discrete RLP sets, data and dictionary indices may not be augmented with zero or more additional bits/bytes/words (as appropriate) until a desired quantum is met, such as a 4-byte boundary. For example, if the number of valid runs is ten, then the compressed packet will contain twelve RLPs in three RLP sets. There can be a total of ten data entries and dictionary indices.

The Compressed with Sort packet 512 contains an additional piece of unsort information 550 added at the beginning of the packet before any RLP or data. Unsort data is a map from the desired order to the order in the packet. Thus, after all run-lengths are unrolled, the $i^{th}$ unsort index is the index of the $i^{th}$ value in the desired order within this unrolled data—essentially a gather operation. This operation can be executed by the following pseudocode:

```
/// Data array obtained after unrolling all runs
unrolledData[chunkSize][(k-1):0] = unrollRunLengths(packet);
/// Output data
output[chunkSize][(k-1):0];
for (i = 0; i < chunkSize; ++i) {
    output[i] = unrolledData[ unsort[i] ];
}
```

Given a block index within the compressed vector buffer 500, per-block metadata 504 identifies which kind of block it is using the following logic:

```
/// Compute size of uncompressed block as the product of the amount of
attribute data
/// per vertex in the vector attribute compressed (VAC) VBO and the
chunkSize which is a power of 2
const sizeOfUncompressedBlock = sizeOfUncompressedVertex <<
log2(chunkSize);
/// Compute number of cachelines required to store uncompressed block
const sizeOfUncompressedBlockCL = ceil (sizeOfUncompressedBlock /
64);
/// Number of cachelines used can never be more than size of
uncompressed block
/// as measured in cacheline granularity
assert (metadata.nCachelines <= sizeOfUncompressedBlockCL);
if (metadata.nCachelines == sizeOfUncompressedBlockCL) {
    /// Is Uncompressed Block
} else if (metadata.sortEn) {
    /// Is Compressed Block with Sort
} else {
    /// Is Compressed Block without Sort
}
```

In one example embodiment, restricting blocks to contain only one kind of packet reduces additional metadata and/or complexity. Allowing a variation of a packet type within a block requires either keeping additional metadata noting the packet type per packet, or defining rules based on parameters like datatype of the underlying attribute.

Figure 6:
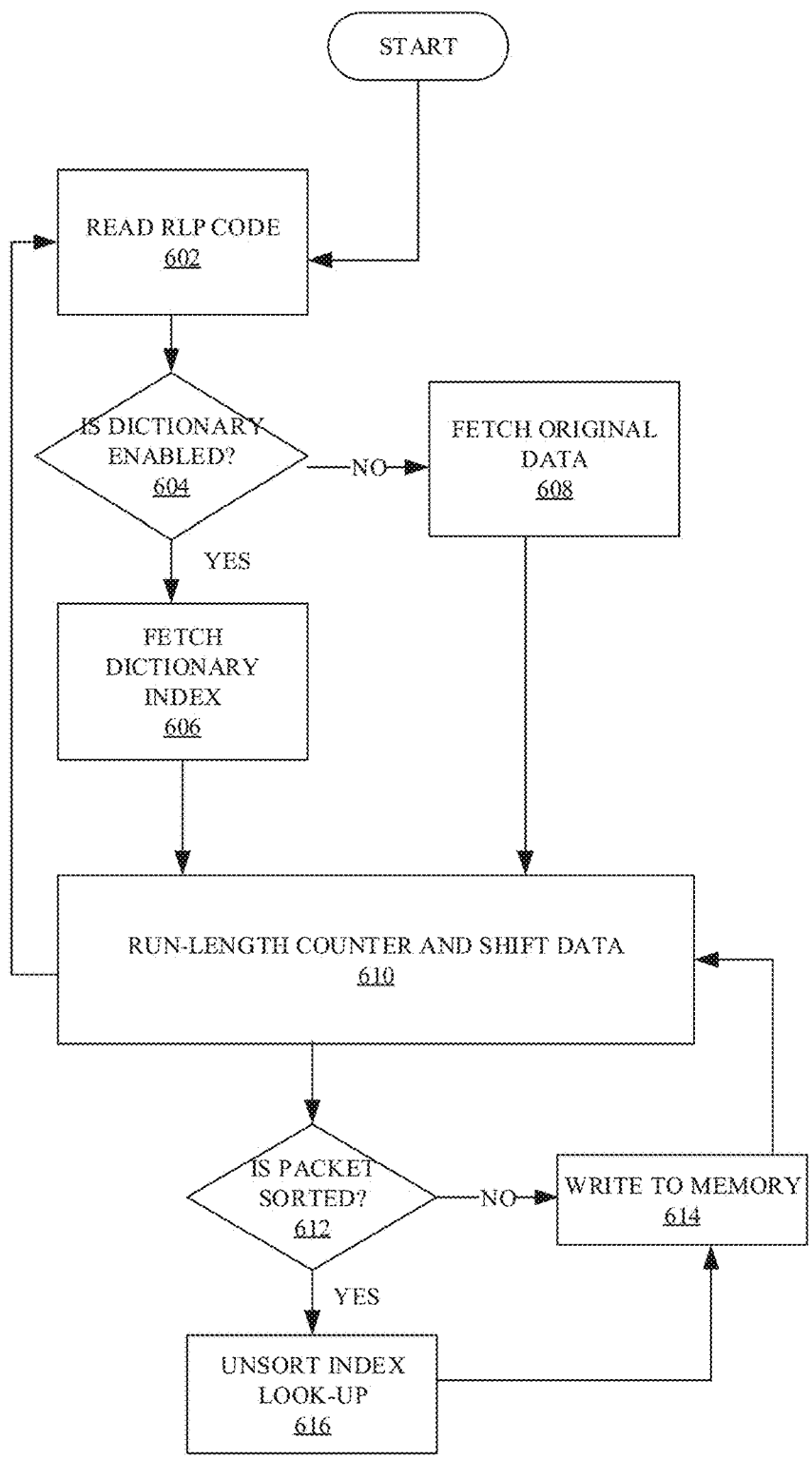
FIG. 6 illustrates a process for decompression according to embodiments of the present disclosure.

FIG. 6 illustrates a process 600 for decompression according to embodiments of the present disclosure. The embodiment of the process 600 shown in FIG. 6 is for illustration only. Other embodiments could be used without departing from the scope of the present disclosure.

FIG. 6 provides the process 600 for decompressing a compressed block once the desired block ID is known. At 602, the decompressor reads the RLP code. The decompressor, at 604, determines whether the dictionary is enabled. If the dictionary is enabled, at 606, the decompressor fetches a dictionary index. If the dictionary is not enabled, at 608, the decompressor fetches the original data. When fetching the data, the decompressor fetches a block from the compressed vector buffer, pseudocode for which is shown below.

```
/// Fetch block data and return number of cachelines fetched
uint fetchBlock (uint blockID, byte &retdata[8*64], bool &isCompressed,
bool &isSort) {
```

```
/// Get metadata - 4-bits wide, so get byte and extract
Metadata entry = ((metadataArray[blockID / 2]) >> (blockID modulo 2))
& 0xF;
/// Subtracting 1 since field is biased
isCompressed = (entry.nCachelines ==
(sizeOfUncompressedBlockCL-1)); isSort = (isCompressed &&
entry.sortEn);
/// '<=' used due to bias
for (i = 0; i <= entry.nCachelines; ++i) {
/// Get relevant cachelines starting at offset blockID *
sizeOfUncompressedBlockCL
retdata[(64*i)...64*(i+1)]         =         fetchCachelineAt
(dataArray[blockID*sizeOfUncompressedBlockCL]);
}
return entry.nCachelines;
}
```

At 610, the decompressor updates the run-length counter and shifts the data. If there is more data in the packet, the decompressor can continue, at step 602 to read the code. At 612, the decompressor can determine whether a packet is sorted. If the packet is not sorted, at 614, the decompressor writes the data to memory. If the packet is sorted, the decompressor, at 616, identifies unsort index look-up information and then write the data to memory at 614.

Once block data is fetched, and the type of block is known, relevant data can be extracted from it. In different embodiments, all contents of a block may not always be used, and specific packets may as well as data may be extracted for specific vertices. For simplicity, the following pseudocode shows extraction of all data, irrespective of consumption, and does not show masking and extracting subsets.

The first kind of packet requiring decoding is the compressed packet without sort, whose decode pseudocode is shown below:

```
/// Extract data from a compressed packet starting at some arbitrary
half-byte
/// boundary
const halfbyte *decodeCompressedPacket (const halfbyte *indata, datatype
retval[chunkSize]) {
/// Number of scalars read thus far
uint readCount = 0;
static const rlTranslate[ ] = {1, 2, 4, chunkSize};
while (readCount < chunkSize) {
/// Read 12 bits from base and advance pointer
RLPSet set[11:0] = indata[0...3];
indata += 3;
for (i = 0; (i < 4) && (readCount < chunkSize); ++i) {
    /// Is the value a dictionary index?
    bool isDict = set[i*3];
    /// Translate 2-bit RL code into a run length
    uint runLength = rlTranslate[ set[(i*3+2):(i*3+1)] ];
    /// k = log2(sizeOf(datatype))
    datatype val = isDict ? dictionary[indata[0]] : indata[0...(k-1)];
    indata += isDict ? 1 : k;
    nextReadCount = readCount + runLength;
    // Add data into output
    for (; readCount < readCount < nextReadCount; ++readCount)
        retval[readCount] = val;
    }
};
return indata;
}
```

With this decode logic defined, the decode logic for a compressed block with sort is easily implemented as shown below:

```
const halfbyte *decodeCompressedPacketwSort (const halfbyte *indata,
datatype retval [chunkSize]) {
/// Get unsort data by reading the correct number of bytes from input
/// Unsort data size is always in bytes, even though it may start from
a half-byte
unsortData[chunkSize][(log2(chunkSize)-1):0] =
indata[0...(log2(chunkSize)*chunkSize/4)];
/// Advance pointer
indata += (log2(chunkSize)*chunkSize/4);
/// Intermediate staging buffer
datatype intermediate[chunkSize];
/// Decode compressed packet into intermediate staging buffer
indata = decodeCompressedPacket (indata, intermediate);
for (i = 0; i < chunkSize; ++i) {
    retval[i] = intermediate[ unsort[i] ];
}
return indata;
}
```

The pseudocode shown above fetches specific packets from the data stream that constitutes a block. For compressed packets, for determining the size only, no unsort operations or any data extraction operations are needed—only RLPs need to be extracted and interpreted.

One or more embodiments of this disclosure provide a compressor to create a compressed block given an input block. One task of the compressor is to determine the ideal dictionary, and another task is to determine whether each block must be uncompressed, compressed without sort, or compressed with sort.

Though these tasks are interrelated, i.e. the ideal dictionary is one that obtains the maximal compression, which in turn depends on which block type is used for each chunk of data, the tasks can be approximated sufficiently by separately solving each task as a series of dependent subtasks. This constitutes an approximation algorithm for what is a coupled optimization. While one or more embodiments may use an approximation, any implementation—particularly by the compressor—may choose a different approximation. Even in this approximation, the algorithm proposed can be a two-pass algorithm, even though it may be implemented as an extended one-pass algorithm if sufficient buffer space is available.

The first task in this embodiment is to create intermediate blocks in the absence of a dictionary. This begins by collecting information about the attributes for each vertex, and determining the number of vertices that may be stored in a block. This computation is straightforward—sum up the size in bytes of all attributes of a vertex that must belong to this VAC compressed vector buffer object (VBO), and divide 8*64 bytes by that number. The number of vertices in a block is then the largest of four values {4, 8, 16, 32} that is less than or equal to the value obtained in the previous step. Please note that the number 8*64 (8×64B cachelines) is simply the amount of buffering dedicated within the vector data compressor (VDC) for one VAC block, and is an arbitrary restriction based on the average attribute load expected in most cases In one or more embodiments, a compressor can create intermediate blocks based on the number of vertices in the block. To create the intermediate blocks, the compressor can retrieve all attributes for vertices within the block, and transpose them into Structure-Of-Arrays (SOA) order. This can be achieved by the following pseudocode:

```
/// Illustrative function to gather attributes and create SOA structures
/// Returns number of uncompressed packets created
/// Note: ignores boundary conditions like out-of-bounds for simplicity
uint createUncompressedSet (void* basePtr, uint firstVert, uint lastVert,
vgstate *slots, uint nslots, soa **uncompressedPacketsArrayPtr) {
    /// First, determine the number of packets that will be necessary
    uint numPackets = 0;
    for (uint i = 0; i < nslots; ++i) {
        /// If slot is not enabled, or if slot has an instanced attribute, skip it
        if (!slots[i].enabled OR slots[i].instanceEn) continue;
        /// Function determines the number of 32-bit scalars required to keep
        the
        /// given attribute format. Is essentially ceil(sizeof(format) / 32)
        uint np = numberOfScalarsInAttribute (slots[i].SrcFormat);
        numPackets += np;
    }
    /// Early exit if no data to compress
    if (numPackets == 0) return 0;
    /// Allocate space, and store pointer
    soa *uncompressedPackets = new soa[numPackets];
    (*uncompressedPacketsArrayPtr) = uncompressedPackets;
    uint packetOffset = 0;
    for (uint i = 0; i < nslots; ++i) {
        if (!slots[i].enabled OR slots[i].instanceEn) continue;
        uint np = numberOfScalarsInAttribute (slots[i].SrcFormat);
        for (uint j = firstVert; j < lastVert; ++j) {
            /// Fetch vector attrib data for ith slot, jth vertex
            uint data[4] = fetchAttribute (i, j);
            /// Write the scalar into the correct soa
            for (uint k = 0; k < np; ++k)
uncompressedPackets[packetOffset+k][j-firstVert] =
data[k];
        }
        /// Increment packetOffset
        packetOffset += np;
    }
    return numPackets;
}
```

The pseudocode above is simplistic by design, and does not handle out-of-bounds cases, and performs an inefficient style of memory allocation. In another example, all memory allocation could happen once to minimize the number of disjoint allocations, if this scratch space is to be maintained. If it is not, the same scratch space can be reused for the next block. In addition, if any scalar does not utilize the full 32-bits, the final SOA storage may store the used bits for each value, rather than all 32. Possible sizes of each individual scalar in this case include 8, 16, 24 or 32 bits. However, the intermediate representation may choose to keep all data as 32-bits for simplicity.

In an embodiment, the compressor code could convert the intermediate representation into a VAC block representation (minus dictionary compression). This data is already an uncompressed block, and can be converted into compressed block without a sort. The block could then be kept as one of these two types. In one example embodiment, the type can be chosen based only on which type, compressed or uncompressed, provides a minimal size. The selection can be irrespective of quantization losses when padding up to the 64B boundary. No sorting may be done up to this point. The sorting may only increases the likelihood that scalars, which may end up in that type of block, will also end up in the dictionary. Thus, sorting can increase the likelihood that there are more blocks of type compression, which will increase compression overall.

At this point, an implementation may choose to keep all blocks in this representation, or only generate one block at a time to feed the next stage. Depending on the option chosen, this process is an extended one-pass approach if all blocks are kept, and a two-pass approach if only one block is generated. The choice can depend on the amount of working memory the implementation would like to use—the two-pass approach may use only one block's worth of additional memory, which may result in more cache hits.

The dictionary in this embodiment of VAC is per-VBO, thus it can be tuned to the VBO in question. However, any implementation may choose to reuse all or parts of a dictionary across VBOs for implementation efficiency at the cost of compression.

One or more embodiments of this disclosure recognize and take into account that a problem of creating the dictionary is to find the top X (e.g., 13) entries in the histogram of all 32-bit data entries within the VBO. This problem is that of creating a sparse histogram of the data, and keeping the top X entries in that as the dictionary.

The dictionary can consist of the highest frequency of occurrences of scalars in the intermediate representation created at the end of the first stage. That is, a run of any length counts as one occurrence of a scalar. For example, a run (4, 4.5) meaning four instances of 4.5 would count as only one occurrence of 4.5 for the purposes of creating a dictionary.

Figure 7:
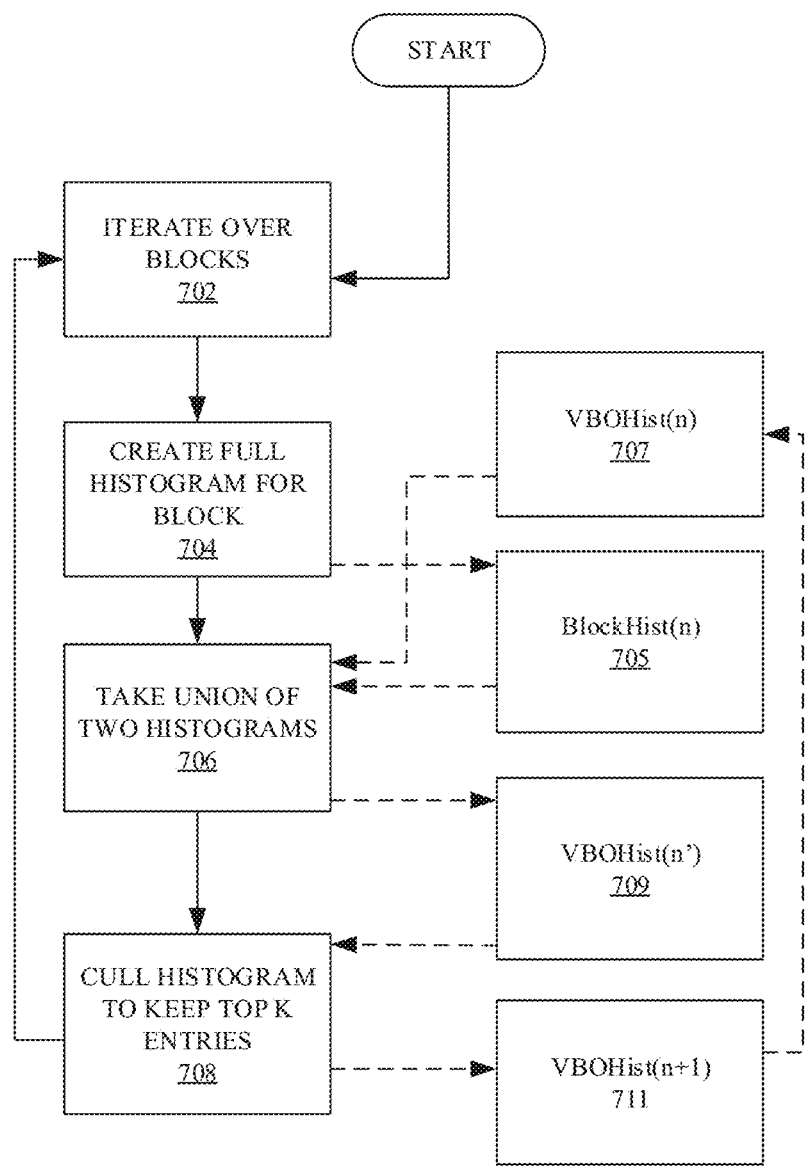
FIG. 7 illustrating a process for creating a dictionary according to embodiments of the present disclosure.

FIG. 7 illustrates a process 700 for creating a dictionary according to embodiments of the present disclosure. The embodiment of the process 700 shown in FIG. 7 is for illustration only. Other embodiments could be used without departing from the scope of the present disclosure.

In FIG. 7, a standalone full histogram is created. At 702, a compressor can iterate over a block. At 704, the compressor can create a histogram 705 for the bock based on the information from the iteration. After this histogram 705 is created for a block, at 706, the histogram 705 is merged with a running histogram 707 for the VBO, i.e. a union histogram 709 of both histograms is created. The running histogram 707 can be created from a prior iteration. At the end of the union, at 708, the compressor selects the top k values in the histogram 709 and discards the remaining values. After the selection, the compressor can run process 700 for the next block, using the union histogram 709, and update to a new VBO histogram 711.

The histogram is simply to be truncated, keeping only the most-common values for dictionary entries.

Another embodiment provides a process to create a full histogram of a subset of the blocks. Certain blocks are chosen randomly and a full histogram is created naively from this subset of blocks. When selecting blocks, an effort is made to collect a similar number of both blocks, and not bias (that is ensure best-effort fairness) on all of the following:

Block type: uncompressed, compressed without sorting approximating uniform sampling to the extent possible whenever it does not conflict with any of the other conditions; and Vertex ID range: sample the entire vertex ID range approximating uniform or Poisson distribution in that space.

The sampling should prioritize fairness in the vertex ID range over block type when they are in conflict.

In order to reduce the memory footprint of histogram code, in one or more example embodiments, a binning approach may be used. A binning process can divide an entire spectrum into k bins, for a certain value of k, and determine the coarse histogram of the dataset. The proposed process is to first compute a coarse histogram and then focus the fine histogram generation to values within the top N bins only, i.e. all values outside of the top N bins are ignored for histogram generation. The binning approach may also be used as a strategy to reduce the complexity when used in conjunction with other processes.

Figure 8:
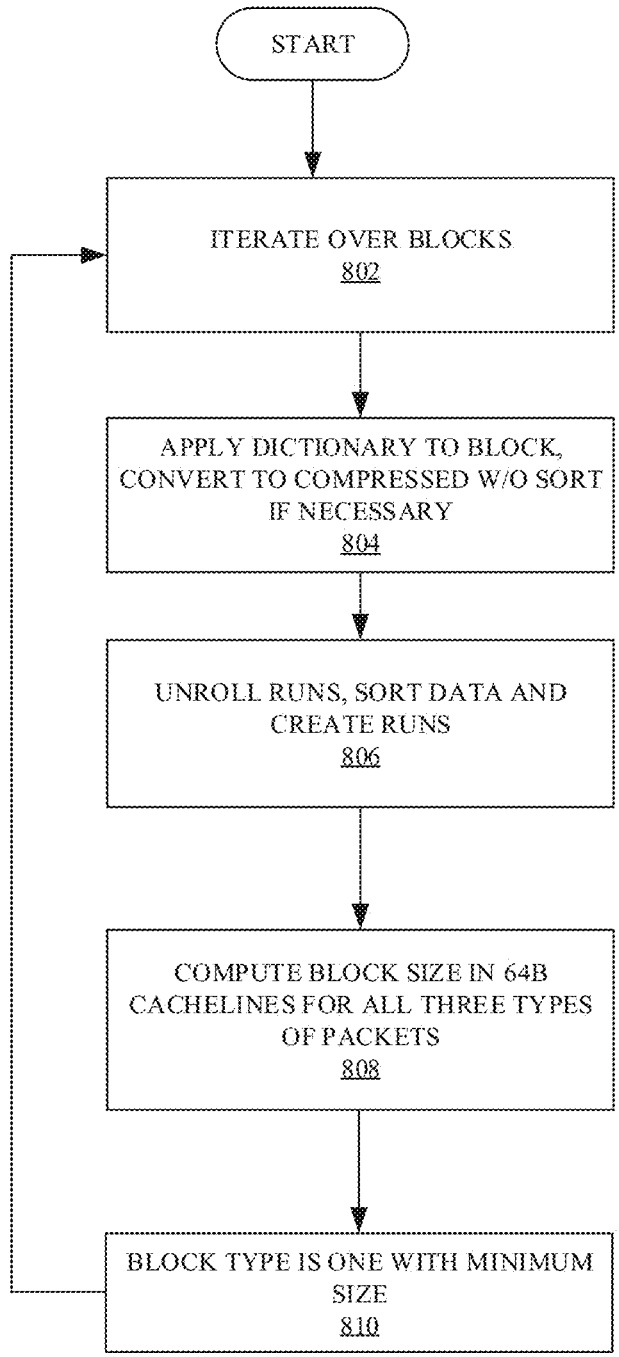
FIG. 8 illustrates a process for the usage of a dictionary during compression according to embodiments of the present disclosure.

FIG. 8 illustrates a process 800 for the usage of a dictionary during compression according to embodiments of the present disclosure. The embodiment of the process 800 shown in FIG. 8 is for illustration only. Other embodiments could be used without departing from the scope of the present disclosure.

As the last step of the compression process, a dictionary created in the last step is applied to the intermediate block data. Process 800 could be used on each block.

At step 802, the compressor iterates over each block. At step 804, the compressor applies the dictionary to each block, and converts the block to compressed without sort. In another example embodiment, the block can first be sorted. At step 806, the compressor can sort the data and create a run to obtain a compressed with sort block. At step 808, the compressor can compute the block size in a 64 MB cacheline for compressed with sort, compressed without sort, and uncompressed blocks. At step 810, the compressor selects a block type with the minimum size. If sizes are equal on two or more types, then priority goes to the uncompressed, then compressed without sort, then compressed with sort.

Process 800 allows two variations which different embodiments may use under certain conditions. One example may choose to keep the data in SOA form (i.e. as an uncompressed block) after 804, and make the histogram creation code aware of the counting philosophy. The compressor can count scalar only once for each continuous run of values. This can remove the need to unroll runs, and the final stage can run as purely a process of uncompressed being converted to compressed without sort and compressed with sort only at the end. In another example, if the process 800 needs to be time sensitive, the process 800 may revert to an extremely simple dictionary, or not create one at all if under time pressures. In such a situation, some compression may still be obtained purely using the different block types.

One or more embodiments of this disclosure provides a process to allow all run-lengths possible within a chunk with the following design:

2-bit enumeration noting if the following data is a, (a) Run-length of a value not in the dictionary, (b) Run-length of a value in the dictionary, (c) Dictionary value, single occurrence, or (d) Non-dictionary value, single occurrence.

Depending on the enumeration, one of (a) a tuple (run-length, value), where run-length is in the range 1 . . . chunkSize, (b) a tuple (run-length, dictionary index), where run-length is in the range 1 . . . chunkSize, and dictionary index is an n-bit binary number for a dictionary with $2^n$ entries, (c) a dictionary index, an n-bit binary number for a dictionary with $2^n$ entries, or (d) a value in its inherent bit-width.

One or more of these embodiments allows a larger percentage of packets to be compressed with a lower compression ratio due to a larger prefix. In other words, different variants of the compression may be more efficient than others. That is, different embodiments may allow the compression to be applicable to a large or smaller percentage of input data, which may be at the cost of varying compression ratios per block and per vertex buffer.

Another embodiment is possible where an array of 2-bit enumerations at the beginning of a block note the type of each packet within the block—uncompressed, compressed without sorting, or compressed with sorting.

Figure 9:
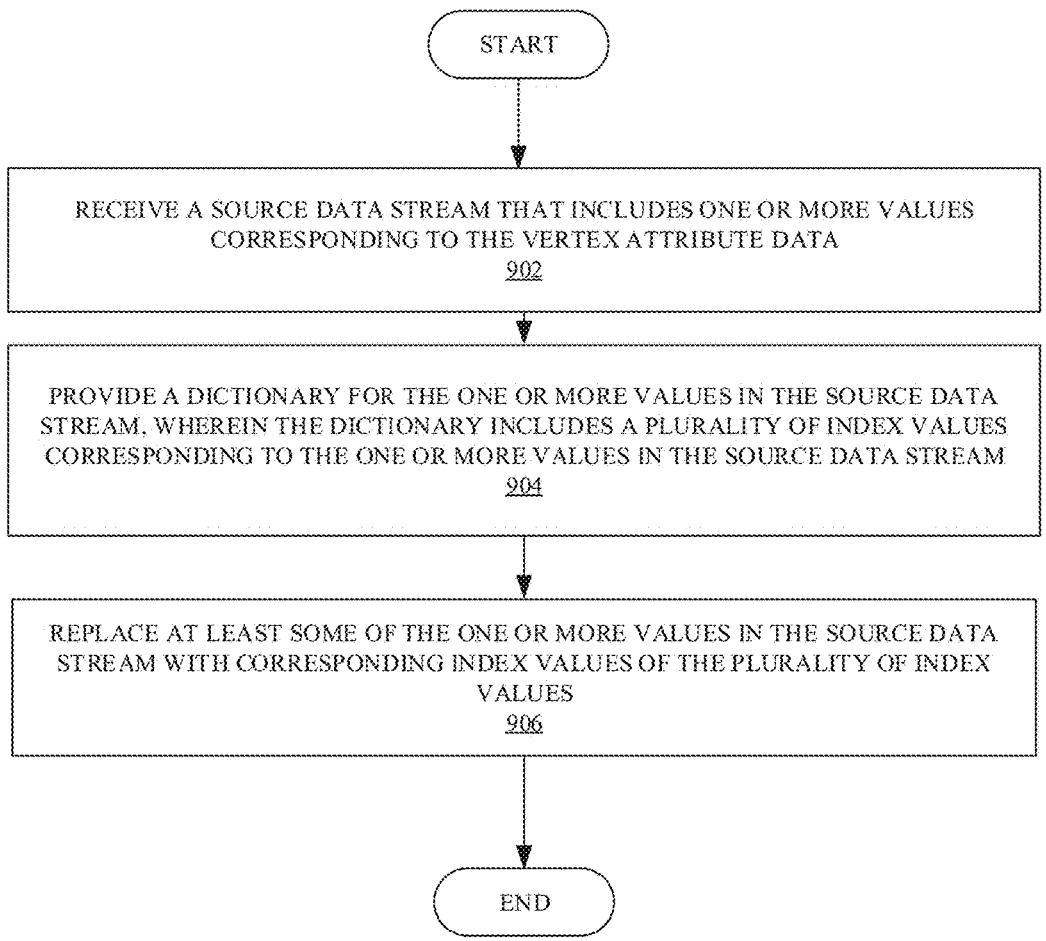
FIG. 9 illustrates a process for compression according to embodiments of the present disclosure.

FIG. 9 illustrates a process 900 for compression according to embodiments of the present disclosure. Process 900 can be executed by processing circuitry, a processor, graphics processor. A processor can execute a set of instructions to perform the operations of process 900. The process 900 can be implemented by compressor 300 as shown in FIG. 3.

At operation 902, the compressor receives a source data stream that includes one or more values corresponding to the vertex attribute data. The source data stream can be an input stream directly from memory. The source data can be graphics application data that is un-encoded data. The source data stream can also include data comprising two or more data types. In one or more embodiments of this disclosure, each of the one or more values is equivalent over the two or more data types. In an example embodiment, the two or more data types include at least integer and floating point data types.

At operation 904, the compressor provides a dictionary for the one or more values in the source data stream. The dictionary includes a plurality of index values corresponding to the one or more values in the source data stream. In different embodiments, the dictionary can be previously generated, or generated during compression.

At operation 906, the compressor can replace at least some of the one or more values in the source data stream with corresponding index values of the plurality of index values. In one example, the some of the one or more values of the source data stream that are represented by the corresponding index values of the dictionary are selected using a histogram. The histogram identifies values of the source data stream that occur in accordance with at least a predefined frequency.

In one or more example embodiments, the processor provides the dictionary and replaces the at least some of the one or more values while agnostic to an underlying datatype of the one or more values. That is, the compressor provides compression of the source data stream without regard to the datatype used in the source data stream. As used herein, "providing" a dictionary can also include "creating" or "generating" a dictionary including the plurality of index values corresponding to the one or more values in the source data stream.

Although FIG. 9 illustrates one example of a process 900 for compressing data, various changes may be made to FIG. 9. For example, while FIG. 9 shows a series of steps, various steps could overlap, occur in parallel, occur in a different order, or occur any number of times. In addition, the process 900 could include any number of events, event information retrievals, and notifications.

For example, process 900 could also include an operation to encode continuous occurrences of the one or more values in the source data stream using run-length coding. The compressor can replace at least some of the one or more values in the source data stream with corresponding index values of the plurality of index values. The process 900 could also include an operations partition the source data stream into blocks of vertices, wherein each block contains all relevant attributes of respective vertices in the block, and partition each of the blocks into packets, wherein each of the packets contains one or more attributes for all vertices in the block.

In one or more embodiments, the compressor can also include an operation to sort data within at least some of the packets in a respective order in which a continuity of occurrences of values is greater compared to a continuity when the data is not sorted. In yet another example, the compressor can include an operation to add a code to each block identifying a type of the packets in the block.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus comprising:
a memory configured to store vertex attribute data and a set of instructions; and
at least one processor coupled to the memory, the at least one processor configured to execute the set of instructions to:
receive a source data stream that includes one or more values corresponding to the vertex attribute data;
provide a dictionary for the one or more values in the source data stream, wherein the dictionary includes a plurality of index values corresponding to the one or more values in the source data stream;
replace at least some of the one or more values in the source data stream with corresponding index values of the plurality of index values;
partition the source data stream into blocks of vertices, wherein each block contains all relevant attributes of respective vertices in the block;
partition each of the blocks into packets, wherein each of the packets contains one or more attributes for all vertices in the block; and
sort data within at least some of the packets in a respective order in which a continuity of occurrences of values is greater compared to a continuity when the data is not sorted.

2. The apparatus of claim 1, wherein the source data stream includes un-encoded data.

3. The apparatus of claim 1, wherein providing the dictionary and replacing the at least some of the one or more values are performed while agnostic to one or more underlying datatypes of the one or more values.

4. The apparatus of claim 3, wherein providing the dictionary includes creating the dictionary including the plurality of index values corresponding to the one or more values in the source data stream.

5. The apparatus of claim 1, wherein the at least one processor is further configured to execute the set of instructions to:
encode continuous occurrences of the one or more values in the source data stream using run-length coding.

6. The apparatus of claim 1, wherein the at least one processor is further configured to execute the set of instructions to:
add a code to each block identifying a type of the packets in the block.

7. An apparatus comprising:
a memory configured to store vertex attribute data and a set of instructions; and
at least one processor coupled to the memory, the at least one processor configured to execute the set of instructions to:
receive a source data stream that includes one or more values corresponding to the vertex attribute data;
provide a dictionary for the one or more values in the source data stream, wherein the dictionary includes a plurality of index values corresponding to the one or more values in the source data stream; and
replace at least some of the one or more values in the source data stream with corresponding index values of the plurality of index values, wherein the some of the one or more values of the source data stream that are represented by the corresponding index values of the dictionary are selected using a histogram, wherein the histogram identifies values of the source data stream that occur in accordance with at least a predefined frequency.

8. The apparatus of claim 1, wherein replacing at least some of the one or more values in the source data stream comprises replacing any exact value in the source data with the corresponding index value of the plurality of index values.

9. A method for source data compression, the method comprising:
receiving a source data stream that includes one or more values corresponding to vertex attribute data stored in memory;
providing a dictionary for the one or more values in the source data stream, wherein the dictionary includes a plurality of index values corresponding to the one or more values in the source data stream;
replacing at least some of the one or more values in the source data stream with corresponding index values of the plurality of index values;
partitioning the source data stream into blocks of vertices, wherein each block contains all relevant attributes of respective vertices in the block;
partitioning each of the blocks into packets, wherein each of the packets contains one or more attributes for all vertices in the block; and
sorting data within at least some of the packets in a respective order in which a continuity of occurrences of values is greater compared to a continuity when the data is not sorted.

10. The method of claim 9, wherein the source data steam includes un-encoded data.

11. The method of claim 9, wherein providing the dictionary and replacing the at least some of the one or more values are performed while agnostic to one or more underlying datatypes of the one or more values.

12. The method of claim 11, wherein providing the dictionary comprises creating the dictionary including the plurality of index values corresponding to the one or more values in the source data stream.

13. The method of claim 9, further comprising:
encoding continuous occurrences of the one or more values in the source data steam using run-length coding.

14. The method of claim 9, further comprising:
adding a code to each block identifying a type of the packets in the block.

15. The method of claim 9, wherein the some of the one or more values of the source data stream that are represented by the corresponding index values of the dictionary are selected using a histogram, wherein the histogram identifies values of the source data stream that occur in accordance with at least a predefined frequency.

16. The method of claim 9, wherein replacing any value in the source data with a corresponding index value of the plurality of index values comprises:
replacing any equivalent value in the source data with the corresponding index value of the plurality of index values.

* * * * *